US011882857B2

(12) United States Patent
MacPherson (10) Patent No.: US 11,882,857 B2
(45) Date of Patent: Jan. 30, 2024

(54) BREWED BEVERAGES AND METHODS FOR PRODUCING SAME (71) Applicant: Charles D. MacPherson, Santa Barbara, CA (US)

(72) Inventor: Charles D. MacPherson, Santa Barbara, CA (US)

( * ) Notice: Subject to any disclaimer, the term of this patent is extended or adjusted under 35 U.S.C. 154(b) by 385 days.

(21) Appl. No.: 16/744,751

(22) Filed: Jan. 16, 2020

(65) Prior Publication Data

US 2020/0146316 A1 May 14, 2020

Related U.S. Application Data (63) Continuation of application No. 15/049,822, filed on Feb. 22, 2016, now Pat. No. 10,568,348, which is a continuation of application No. 13/695,701, filed as application No. PCT/US2011/036465 on May 13, 2011, now Pat. No. 9,307,777.
(Continued)

(51) Int. Cl.
*A23L 3/36* (2006.01)
*A23F 3/16* (2006.01)
*A23F 3/20* (2006.01)
*A23F 5/18* (2006.01)
*A23F 5/24* (2006.01)
(Continued)

(52) U.S. Cl.
CPC .............. *A23L 3/364* (2013.01); *A23F 3/163* (2013.01); *A23F 3/18* (2013.01); *A23F 3/20* (2013.01); *A23F 5/18* (2013.01); *A23F 5/243* (2013.01); *A23F 5/26* (2013.01); *A23V 2002/00* (2013.01)

(58) Field of Classification Search
None
See application file for complete search history.

(56) References Cited

U.S. PATENT DOCUMENTS

| 3,799,049 A | 3/1974 | Smith, Jr. |
| 4,852,359 A | 8/1989 | Mazzotti |

(Continued)

FOREIGN PATENT DOCUMENTS

JP 2009095333 5/2009

OTHER PUBLICATIONS

Kelley, Glucose Oxidase Reduces Oxidation in Frozen Shrimp, Commericial Fisheries Review, vol. 33. No. 906 (Year: 1971).*
(Continued)

*Primary Examiner* — Viren A Thakur
*Assistant Examiner* — Thanh H Nguyen
(74) *Attorney, Agent, or Firm* — Morgan, Lewis & Bockius LLP; Nicholas A. Restauri (57) ABSTRACT A brewed beverage product is provided that, in some embodiments, may comprise an oxygen permeable container containing a frozen deoxygenated brewed beverage, the frozen deoxygenated brewed beverage including a coffee or tea based beverage or concentrate having been its dissolved oxygen content reduced to less than 2.0 parts per million (ppm) in order to reduce oxidation of coffee or tea-based flavor compounds in the degassed coffee or tea based beverage or concentrate. The frozen deoxygenated brewed beverage may further have an exterior surface formed from
(Continued)

a frozen deoxygenated liquid so as to be substantially void-free in order to limit the ingress of oxygen into the frozen deoxygenated brewed beverage.

20 Claims, 2 Drawing Sheets

Related U.S. Application Data (60) Provisional application No. 61/345,455, filed on May 17, 2010.

(51) Int. Cl.
*A23F 3/18* (2006.01)
*A23F 5/26* (2006.01)

(56) References Cited

U.S. PATENT DOCUMENTS

| | | | |
|---|---|---|---|
| 5,319,910 | A | 6/1994 | Takata et al. |
| 5,340,384 | A | 8/1994 | Sims |
| 5,425,497 | A | 6/1995 | Sorensen |
| 5,493,866 | A | 2/1996 | Hotaling |
| 6,093,436 | A | 7/2000 | Zheng et al. |
| 6,231,907 | B1 | 5/2001 | Kino et al. |
| 6,770,314 | B1 | 8/2004 | Scott et al. |
| 7,585,439 | B2 | 9/2009 | Branch et al. |
| 2004/0074799 | A1 | 4/2004 | Bell |
| 2008/0163643 | A1 | 7/2008 | Strunk |
| 2009/0041905 | A1 | 2/2009 | Markillie et al. |
| 2010/0075009 | A1 | 3/2010 | Stem |

OTHER PUBLICATIONS

Butler, et al., "Removal of Dissolved Oxygen from Water: A Comparison of Four Common Techniques"; Talania, vol. 41, pp. 211-215, copyright 1994, marked as accepted Aug. 9, 1993.
Hemmingsen, "Permeation of Gases through Ice", Tellus XI; pp. 355-539; 1959, marked as received Sep. 9, 1958.
Perez-Martinez, et al., "Effecs of refrigeration and oxygen on the coffee brew composition"; Eur Food Res. Technol., 227:1633-1640, published online May 27, 2008.
Cielo, Oxygen Enriched PUrified Water: "Like Water for Coffee", production description downloaded from http:/www.cielowater.com/coffee.php on Apr. 13, 2011 at 11:59 p.m., 2 pages.
International Search Report dated Aug. 16, 2011 for International Application No. PCT/US2011/036465.
Written Opinion dated Aug. 16, 2011 for International Application No. PCT/US2011/036465.
International Preliminary Report on Patentability completed Jul. 11, 2012 for International Application No. PCT/US2011/036465.
Welding Journal, Captured Nov. 16, 2009 <https://web.archive.org/web/20091116152644/http://www.faybutler.com/pdf_files/HowHoseMaterialsAffectGas3.pdf>.
Non-Final Office Action dated Oct. 28, 2014 for U.S. Appl. No. 13/695,701.
Non-Final Office Action dated Apr. 17, 2015 for U.S. Appl. No. 13/695,701.
Final Office Action dated Oct. 22, 2015 for U.S. Appl. No. 13/695,701.
Notice of Allowance dated Jan. 14, 2016 for U.S. Appl. No. 13/695,701.

\* cited by examiner

BREWED BEVERAGES AND METHODS FOR PRODUCING SAME

RELATED APPLICATIONS

This application is a continuation of and claims the priority benefit of U.S. patent application Ser. No. 15/049,822, filed Feb. 22, 2016, now issued as U.S. Pat. No. 10,568,348, which is a continuation and claims the priority benefit of U.S. patent application Ser. No. 13/695,701, filed Nov. 1, 2012, now issued as U.S. Pat. No. 9,307,777, which is a 35 U.S.C. § 371 filing based on International Application Serial No. PCT/US2011/036465, filed May 13, 2011, which claims the benefit of U.S. Provisional Application No. 61/345,455, filed May 17, 2010, each of which are incorporated herein by reference, except that in the event of any inconsistent disclosure or definition from the present specification, the disclosure or definition herein shall be deemed to prevail.

TECHNICAL FIELD

The present invention relates generally to beverages—in some embodiments to coffee-based beverages—and to methods for the production thereof.

BACKGROUND

Coffee is a popular beverage that can be enjoyed both hot and cold and in a variety of forms, including but not limited to espresso, lattes, iced coffees, and the like. A particularly popular form of coffee is brewed coffee in which hot water or steam is percolated through roasted coffee bean grounds in a process referred to as brewing.

It has been shown that the most flavorful brewed coffee is achieved when freshly roasted coffee beans are ground and brewed, and consumed by a person within the first one hour of the brewing process. It is accepted that the optimal flavor for a coffee beverage is achieved by consuming the product within the first 30 minutes after brewing. Such a short duration of time between brewing a coffee beverage and its consumption limits the exposure time of the coffee to heat and oxygen which can react with and/or otherwise cause the decomposition and/or polymerization of one or more of the many chemical compounds responsible for the coffee-based beverage's desirable tastes and aroma—chemical processes that can reduce the desired coffee flavors and introduce undesirable bitter and/or stale flavors.

Conventional wisdom has long held that coffee cannot be stored for extended periods of time without loss of flavor. In an effort to address this problem, instant coffee using the process of freeze-drying was developed and patented. Although the freeze drying process does produce a form of coffee that can be stored for extended period of times, the freeze dried product must be reconstituted in hot water producing a beverage that has a taste and flavor that no longer resembles freshly brewed coffee.

In short, it would be highly desirable to provide a coffee-based beverage and, indeed, other types of brewed beverages that can be stored for extended periods of time without exhibiting a concomitant loss of flavor and/or other undesirable deteriorations in taste, and which can be consumed without requiring reconstituting.

SUMMARY

The scope of the present invention is defined solely by the appended claims, and is not affected to any degree by the statements within this summary.

By way of introduction, a method for producing a brewed beverage in accordance with the present teachings includes brewing the beverage, degassing the beverage prior to storing the beverage in a sealed container, and freezing the beverage.

A first brewed beverage in accordance with the present teachings is produced according to methods of a type described above.

A frozen brewed beverage in accordance with the present teachings is configured to be reheated prior to consumption and does not require reconstituting.

A second brewed beverage in accordance with the present teachings is in a sealed container, has a dissolved oxygen content less than about 2 ppm, is configured to be reheated prior to consumption, and does not require reconstituting.

DETAILED DESCRIPTION

Beverages that can be stored for an extended period of time and later reheated without experiencing a degradation in flavor relative to the freshly brewed flavor that exists prior to packaging have been discovered and are described hereinbelow. In some embodiments, the beverage is obtained through a brewing process. In some embodiments, the beverage is coffee-based. In some embodiments, the beverage is tea-based.

By way of introduction, the ability to maintain the flavor of freshly brewed beverages for extended periods of time provides a method for the long-term storage of beverages (including but not limited to coffee-based beverages) that requires no reconstitution—only reheating of the product. Thus, the methods in accordance with the present teachings produce a product that allows the consumer the convenience of purchasing a frozen beverage product that can be stored in the freezer section of a refrigerator for an extended period of time and then taken out and reheated, so as to experience the taste and flavor of the beverage as if it were freshly brewed. In the case of a coffee-based beverage, the consumer is not required to purchase freshly roasted coffee beans, grind the beans with a grinding tool, have access to and/or operate a coffee brewing system, or have access to high quality water to add to the coffee brewer in order to enjoy a coffee flavored beverage having the flavor of freshly brewed coffee. On the contrary, the consumer need only have access to a freezer to store the containers containing the frozen coffee beverage and a heating source such as a microwave oven or a stove top cooking element to heat the frozen coffee beverage. Moreover, the consumer does not need to add water to the frozen beverage in order to consume the beverage. The only step is to heat the frozen beverage to the desired temperature. Of course, the consumer may also wish to add additional ingredients including but not limited to milk, cream, sugar, honey, or the like, although the number and amounts of any such optional ingredients will be determined by the consumer's taste.

Throughout this description and in the appended claims, the following definitions are to be understood:

The term "brewed" refers to a process whereby one or more chemical constituents of a beverage's flavor base (e.g., seeds, herbs, tea leaves, coffee beans, and the like, and combinations thereof) are dissolved in a liquid (e.g., water) through a process of steeping, stewing, soaking, marinating, immersion or the like. In some embodiments, the liquid is hot (e.g., at or near its boiling point) at some point during its contact with the beverage's flavor base.

The term "degassed" refers to the removal of dissolved atmospheric gasses (e.g., oxygen, carbon dioxide, etc.) from liquids. Representative techniques for degassing include but are not limited to those described in an article entitled "Removal of Dissolved Oxygen from Water: A Comparison of Four Common Techniques" (*Talanta*, 1994, 41, No. 2, 211-215), the entire contents of which are incorporated herein by reference, except that in the event of any inconsistent disclosure or definition from the present specification, the disclosure or definition herein shall be deemed to prevail. Representative liquid degassing techniques for use in accordance with the present teachings include but are not limited to purging, boiling at atmospheric pressure, boiling under reduced pressure, sonication under reduced pressure, and the like, and combinations thereof. In some embodiments, degassing is achieved via purging (e.g., bubbling an inert gas—including but not limited to nitrogen, argon, and the like, and combinations thereof—into the liquid for a period of time).

In some embodiments, a beverage in accordance with the present teachings is tea-based—in other words, a beverage derived from a brewing process in which one or more soluble compounds of tea leaves are extracted by hot water and/or steam. Representative tea-based beverages in accordance with the present teachings can prepared from a variety of types of teas including but are not limited to white tea, yellow tea, green tea, oolong, tea, black tea, post-fermented tea, herbal tea (i.e., leaves, flowers, fruit, herbs or other plant material which, technically, are not teas inasmuch as they are devoid of *Camellia sinensis*), and the like, and combinations thereof. Representative types of tea-based beverages in accordance with the present teachings include but are not limited to bata bata, bubble tea (foam tea), cha manao, cha yen (Thai tea), chai (masala chai), Hong Kong milk tea (pantyhose milk tea), iri ko, kashmiri chai, kombucha, matcha, obuku cha, sweet tea, tapioca pearl tea (boba tea), tea punch, the tarik (Malaysian pulled tea), Tibetan yak butter tea, and the like, and combinations thereof.

In some embodiments, a beverage in accordance with the present teachings is coffee-based—in other words, a beverage derived from a brewing process in which one or more soluble compounds of coffee beans are extracted from ground coffee beans by hot water and/or steam. The coffee-based beverage may be produced from a specific type of coffee bean (e.g., the Kona bean) or from a blend of different types of beans grown in different geographical areas. Representative bean types include but are not limited to Columbian, Sumatra, Jamaica Blue Mountain, Panama, and the like, and combinations thereof.

Representative coffee-based beverages in accordance with the present teachings include but are not limited to affogato, café Americano, café au lait, café bombón, caffè latte, café mélange, coffee milk, cafe mocha, ca phe sua da, cappuccino, cortado, eiskaffee, espresso, flat white, frappuccino, galão, Greek frappé coffee, iced coffee, Indian filter coffee, instant coffee, Irish coffee, kopi susu, liqueur coffee, macchiato, mochasippi, naked coffee, Turkish coffee, Vienna coffee, yuanyang, and the like, and combinations thereof.

In some embodiments, the preservation of freshly brewed coffee flavor involves the removal of dissolved oxygen gas from the coffee-based beverage solution prior to the freezing of the beverage into a solid state. The present inventor has discovered—surprisingly and unexpectedly—that without lowering the dissolved oxygen content within the brewed coffee-based beverage solution prior to freezing, there will be significant changes in the chemical composition of the beverage during storage, which result in a noticeable loss of desirable flavor when the coffee is reheated to a temperature of between 60° C. (140° F.) and 80° C. (176° F.) at which brewed coffee is typically drunk. This discovery is surprising and unexpected in view of the fact that some coffee brewers (e.g., the brewer sold under the tradename TRIFECTA by Bunn-O-Matic Corporation, the brewer sold under the tradename RU-1000 by the Wilbur Curtis Company, etc.) deliberately inject air into the liquid as a way to aerate and agitate the liquid, thereby keeping solids dissolved. Moreover, it has been reported that oxygen dissolved in water is responsible for drawing out the rich flavor of the coffee bean during the brewing process, such that oxygen enriched water—for example, the water sold by Cielo (Austin, Tex.)—results in coffee having an enhanced flavor.

In stark contrast to the implications of the above reports, the present inventor has discovered that freshly brewed coffee-based beverage samples in which the beverage was frozen at temperatures below its freezing point without prior elimination or reduction of the oxygen content dissolved in the beverage did not maintain the desired freshly brewed flavor for an extended period of time. It was further discovered that freshly brewed coffee-based beverages which were degassed and stored in a refrigerator between 0° C. (32° F.) and 5° C. (41° F.), such that the beverage was not frozen, did not maintain the original freshly brewed coffee flavor to the same extent achieved by a degassed sample that was also frozen. Thus, in some embodiments, the combination of reducing dissolved oxygen content followed by freezing of the coffee-based beverage below its freezing point in a closed container immediately after brewing preserves the flavor of the freshly brewed coffee for an extended period of time ranging from one day to at least 12 months when stored below the beverage's freezing point. In some embodiments, the coffee-based beverage is an espresso, latte, iced coffee, or the like.

By way of general introduction, a method for producing a brewed beverage in accordance with the present teachings includes brewing the beverage and degassing the beverage prior to storing the beverage in a sealed container. In some embodiments, the method further comprises freezing the beverage.

In some embodiments, the beverage comprises water and the water is degassed prior to being used in the brewing. In other embodiments, the beverage is degassed after the brewing and prior to sealing the container. In some embodiments, the degassing is achieved by purging with a gas selected from the group consisting of nitrogen, argon, helium, neon, sulfur hexafluoride, and combinations thereof.

In some embodiments, the method further comprises dispensing the beverage into a container. In some embodiments, the method further comprises substantially filling a headspace above the beverage with an inert atmosphere, which, in some embodiments, comprises a gas selected from the group consisting of nitrogen, argon, helium, neon, sulfur hexafluoride, and combinations thereof. In some embodiments, the method further comprises sealing the container. In some embodiments, the container is heat-sealed with a metal-containing seal (e.g., an aluminum-containing lid). In other embodiments, the container is sealed with a non-metal seal (e.g., a seal made from polypropylene, polycarbonate, polyethylene, polyethylene terephthalate, or the like, and combinations thereof). In some embodiments, at least a portion of the container (e.g., the portion that retains the beverage after the seal has been removed) is microwavable. In some embodiments, both the container and the seal are microwaveable. In embodiments in which the seal is microwavable, it may be desirable to puncture the seal prior to heating in the microwave in order to prevent the container from exploding.

In some embodiments, the degassing reduces dissolved oxygen content in the beverage by at least about 50 percent, in some embodiments by at least about 75 percent, in some embodiments by at least about 90 percent, in some embodiments by at least about 95 percent, and in some embodiments by at least about 99 percent. In some embodiments, the degassing reduces dissolved oxygen content in the beverage to less than about 2.0 ppm, and in some embodiments to less than about 1.0 ppm.

In some embodiments, the method further comprises heating the beverage in a microwave oven prior to consumption. In other embodiments (e.g., iced coffee), the beverage is heated in a microwave for a short duration of time, such that the beverage is thawed only partially (i.e., ice remains) at the time it is consumed.

In some embodiments, the beverage comprises a coffee concentrate, which will be diluted prior to consumption. In such embodiments, the water used for dilution can be added to the container containing the frozen beverage before or after the container is sealed, such that mixing with the concentrate does not occur until the beverage and/or the water used for the dilution (e.g., the water and the beverage are both frozen in the container but separated by an interface) begin to thaw.

Brewed beverages in accordance with the present teachings can be prepared according to any of the methods described herein.

Although representative methods in accordance with the present teachings will now be described in reference to FIGS. 1 and 2, it is to be understood that these representative schemes are merely illustrative and that certain steps can be omitted (e.g., freezing the beverage, heating the beverage in a microwave, etc.) and additional steps be performed (e.g., adding additional liquid to the beverage, etc.) as desired. In addition, it is to be understood that the sequence of steps shown in the schemes is merely representative and is not to be construed as limiting (e.g., the liquid can be degassed after the beverage has been brewed rather than before). It is to be further noted that while the embodiments described below relate to coffee-based beverages, the methods in accordance with the present teachings are also applicable to other beverages—particularly though not exclusively to brewed beverages, such as tea, herbal drinks, and the like. It is also to be understood that elements and features of the various representative methods described below may be combined in different ways to produce new embodiments that likewise fall within the scope of the present teachings. The drawings and the description below have been provided solely by way of illustration, and are not intended to limit the scope of the appended claims or their equivalents.

Figure 1:
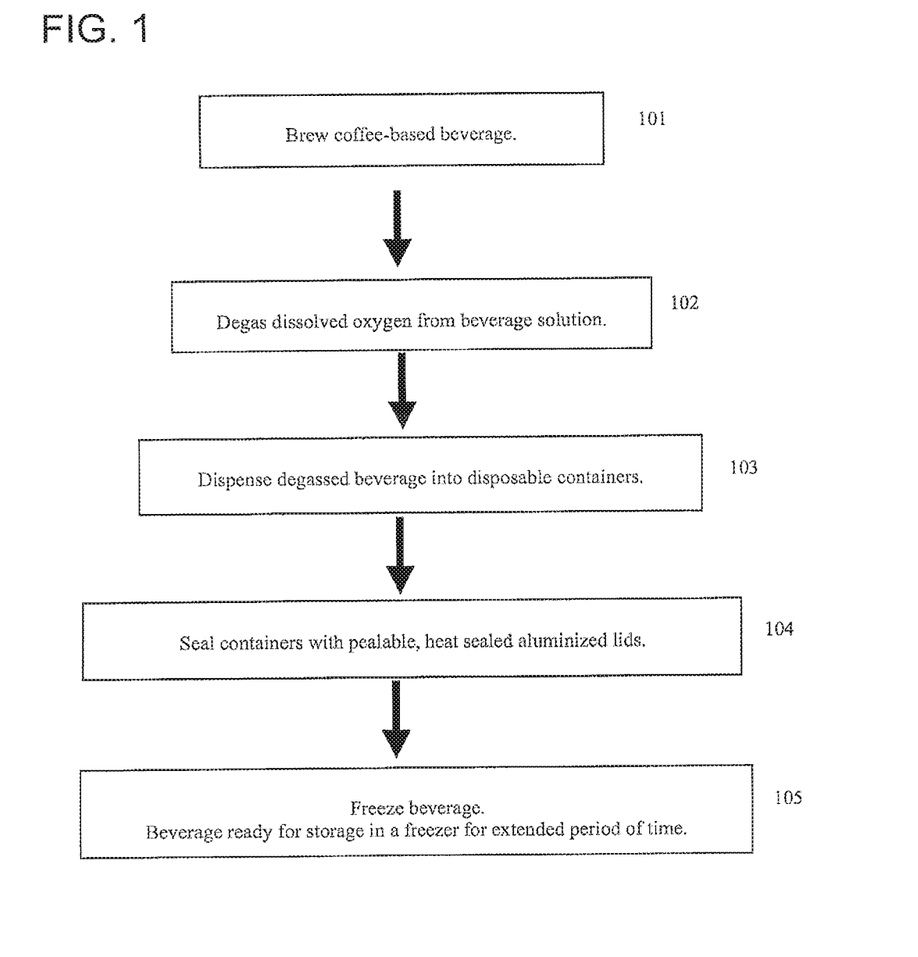
FIG. 1 shows a flowchart of a representative method for making a beverage in accordance with the present teachings.

In some embodiments, as shown in FIG. 1, brewing 101 is the first step in producing a frozen coffee-based beverage. Those skilled in the art will recognize that while the base ingredient of this beverage is coffee, additional ingredients and flavors may also be added, including but not limited to dairy products, sugars, sweeteners, and the like, in a raw or pre-processed form. It is to be understood that a number of different formulations may be turned into coffee-based liquids in accordance with the present teachings.

In some embodiments, as shown in FIG. 1, the second step of the process involves reducing the dissolved oxygen content of the coffee-based beverage by degassing 102. The reduction of dissolved oxygen in coffee-based beverage solution prior to freezing reduces the exposure of sensitive flavor compounds in the coffee to the dissolved oxygen. Without wishing to be bound by a particular theory or to in any way limit the scope of the appended claims or their equivalents, it is presently believed that degassing the brewed coffee-based beverage prior to freezing results in the formation of significantly fewer bubbles and voids in the resulting ice and, therefore, fewer channels through which any oxygen entering the package could penetrate into the frozen beverage and begin to chemically react with the flavor-inducing coffee compounds. Therefore, having the coffee flavor compounds of the beverage encapsulated in ice with few or no defects—a benefit of having first removed the bubble-forming dissolved oxygen prior to freezing—allows for the storage of coffee-based beverages for extended periods of time.

Degassing of the coffee-based beverage prior to packaging and freezing can be accomplished by a variety of techniques. It is also envisioned that the degassing process can be performed at any point in the process up to the time the container is sealed. In some embodiments, degassing is performed prior to freezing of the product (if the product is to be frozen) by degassing the water to be used in the brewing process prior to the brewing step 101. In other embodiments, degassing of the beverage solution is performed after the brewing process 101 is complete and prior to freezing (although, in some embodiments, degassing after brewing may not be desirable if there are volatiles that make desirable contributions to flavor and/or aroma that could potentially be driven out). In step 102 shown in FIG. 1, the degassing process occurs immediately prior to filling the disposable containers and before freezing. Performing the degassing process immediately prior to freezing reduces the risk that oxygen can be re-introduced into the solution and reduces the time in which the beverage solution needs to be maintained under an inert atmosphere before it is packaged, sealed, and frozen.

In some embodiments, the degassing of the coffee-based beverage shown in step 102 of FIG. 1 is accomplished by the ultra-sonic agitation of the beverage solution in a vessel where the headspace is filled with an inert atmosphere such as nitrogen gas. Other gases that could be chosen include but are not limited to argon, helium, neon, sulfur hexafluoride, and combinations thereof. In some embodiments, the ultra-sonic agitation may be performed for a period ranging from about 1 second to about 60 minutes depending on the size of the vessel holding the beverage, the power of the ultrasonic transducer, and the desired reduction of the dissolved oxygen concentration. In some embodiments, the ultra-sonic agitation can be stopped when the dissolved oxygen concentration in the beverage is less than about 10 percent of the concentration before the start of ultra-sonic agitation.

In some embodiments, the degassing process 102 is achieved by connecting the closed vessel containing the beverage solution to a vacuum pump, which lowers the atmospheric pressure in the vessel and causes the release of dissolved gases in the beverage solution. Agitation or stirring can also be performed during the vacuum pumping process to assist in the elimination of the dissolved gases.

In some embodiments, the degassing process 102 is performed by passing the beverage solution through a polymeric semipermeable membrane tube surrounded by a vacuum. The polymeric membrane is designed such that dissolved gases in the beverage solution can permeate the membrane while water and other organic compounds in the beverage cannot. Examples of representative degassing processes for solvents that can be used in accordance with the present teachings are described in U.S. Pat. No. 5,340,384, the entire contents of which are incorporated herein by reference, except that in the event of any inconsistent disclosure or definition from the present specification, the disclosure or definition herein shall be deemed to prevail.

In some embodiments, the degassing process 102 is accomplished by vigorous agitation of the beverage in a closed container that has been purged with an inert gas such as nitrogen. Other potential inert gases can be used instead of or in combination with nitrogen, including but not limited to argon, helium, neon, sulfur hexafluoride, and combinations thereof. The beverage is agitated for a time of between about 1 second and about 5 minutes after which the excess pressure in the container is released by opening a valve. The process is repeated until no noticeable pressure increase is observed. Before each agitation cycle, the atmosphere above the beverage in the vessel can be purged with nitrogen for a period of time to remove any residual oxygen from the atmosphere. The amount of time for the purge process will be dependent on the size of the vessel and the desired reduction in the concentration of dissolved oxygen in the beverage.

In some embodiments, the degassing process is accomplished by bubbling an inert gas such as nitrogen through the beverage in a container, such that dissolved oxygen in the beverage solution is displaced by the inert gas. In some embodiments, in addition to the bubbling, the headspace is also filled with an inert gas. In some embodiments, the bubbling process can proceed for a time ranging from minutes to several hours depending on the volume of beverage being degassed, the bubbling rate, and the desired reduction in the concentration of dissolved oxygen. The degassing by bubbling can also be assisted with stirring and/or with a vacuum applied to the headspace above the beverage. As will be appreciated by the skilled artisan, any combination of degassing techniques—both the techniques described above as well as all manner of additional degassing techniques—may be used to achieve the degassed beverage solution of 102 without deviating from the present teachings. It is to be understood that the particular degassing technique or techniques used in accordance with the present teachings is not restricted.

In the third step 103 of the flowchart shown in FIG. 1, the degassed coffee-based beverage is dispensed into containers, which, in some embodiments, are disposable. The disposable containers can be designed such that the beverage can be drunk directly from the container after reheating in a microwave oven. In some embodiments, the container prior to sealing contains a headspace sufficient to allow for the expansion of water upon its conversion to ice (thereby minimizing stress to the container upon freezing of the beverage). In some embodiments, the disposable container can hold at least 236 mL (8 US fl. oz.). In some embodiments, the container is made from a recycled polymer in which air is injected into the core to create an insulating barrier, such that the container can still be held on the outer surface comfortably by a person's bare hand even when it contains a hot liquid. One such material is described in U.S. Pat. No. 7,585,439, the entire contents of which are incorporated herein by reference, except that in the event of any inconsistent disclosure or definition from the present specification, the disclosure or definition herein shall be deemed to prevail.

In some embodiments, the container can hold a liquid volume of at least one fluid ounce. The coffee-based beverage will assume the shape of the container when the beverage is dispensed into it and frozen. In some embodiments, the container may have a slight wedge shape such that the diameter of the bottom portion of the container is smaller than the top portion. In such a design, the frozen coffee-based beverage can be easily removed from the container by the consumer and dropped into another container such as a ceramic mug. The frozen beverage block in the shape of the disposable container can be easily slid out when warmed by the consumer's hand for a few seconds. A thin layer of water forms at the plastic container/ice interface, such that the frozen beverage can easily slide out of the disposable container. Some consumers may wish to drink the beverage from their own coffee mug rather than from the container in which it is packaged. Thus, the frozen beverage can be transferred to the mug, and the mug can then be reheated in a microwave oven. Although this choice is available to the consumer, it is not a requirement since the frozen coffee-beverage can be reheated and consumed directly in the disposable container in which the product was supplied.

Brewed beverages in accordance with the present teachings can be used to advantage both in the hospitality industry (e.g., restaurants, hotels, catering services, and the like) as well as by individual consumers in their homes. For example, with respect to the former, many high-end restaurants, hotels, and the like steer away from serving the highest quality coffees (e.g., Jamaica blue mountain coffee beans) in view of the high cost of the beans and the fact that a considerable amount of the brewed coffee is ultimately left unconsumed by clientele and is eventually discarded. However, in accordance with the present teachings, individual cups of the high-end coffees can be prepared as requested without any compromise in fresh brewed flavor, without waste of product, and at the minimum of expense to the establishment. This is particularly true with respect to embodiments in which a frozen coffee-based beverage in accordance with the present teachings is easily removable from its container such that it can be transferred into another venue-specific container (e.g., a coffee cup emblazoned with a hotel's name) prior to being heated and served to a customer. From the point of view of an individual consumer, the brewed beverages in accordance with the present teachings are highly desirable since a product with a consistently good flavor can be prepared from a higher quality water (e.g., purified, micro-filtered, mineral-enhanced, etc.) than might otherwise have been available to the consumer, which does not require the consumer to experiment unnecessarily with varying proportions of coffee grounds to water in an effort to optimize the flavor and/or strength of the brewed beverage.

In some embodiments, the frozen coffee-based beverage is packaged in a polymer container that does not have thermal insulating properties sufficient to prevent the outside of the container from becoming so hot after the reheating of the frozen coffee-based beverage as to make holding the container in a person's bare hands uncomfortable. In such cases, a paper-based insulating sleeve can be included in the packaging of the product so that the consumer can place the sleeve around the container to improve the comfort to the person holding the reheated beverage. Such a representative paper sleeve is described in U.S. Pat. No. 5,425,497, the entire contents of which are incorporated herein by reference, except that in the event of any inconsistent disclosure or definition from the present specification, the disclosure or definition herein shall be deemed to prevail.

Representative polymer materials from which the container and/or its lid can be constructed include but are not limited to polypropylene (PP), polycarbonate (PC), low density polyethylene (LDPE), high density polyethylene (HDPE), polyethylene terephthalate (PET), and the like, and combinations thereof. In some embodiments, the choice of container can also be influenced by the oxygen transmission rate of the polymer material. Materials that provide better oxygen barrier properties can help to prevent the reintroduction of oxygen into the coffee solution after the degassing and freezing steps. Although PET provides a good barrier to oxygen and, in some embodiments, can be used to make the container, PET has a relatively low softening point that can render it an unsatisfactory container material if the container containing the frozen beverage is to be heated in, for example, a microwave. However, since the beverage stored in the container is already degassed—which results in a higher quality ice lacking many of the bubbles and voids found in ice prepared from oxygen-infused water, as noted above—a less effective oxygen barrier material (e.g., polypropylene) having a higher softening point than PET, which is suitable for use in a microwave, can be used instead. The reason that a material like PP can be used in place of PET without unduly subjecting the beverage in the sealed container to undesirable oxidation is that without the bubbles and voids of conventional oxygen-containing ice, any reaction involving oxygen permeating the container will largely be restricted to the surface of the frozen beverage since such oxygen cannot adequately penetrate the ice itself in the absence of bubbles and voids as explained, for example, in the article entitled "Permeation of Gases through Ice" (*Tellus XI*, 1959, 3, 355-359), the entire contents of which are incorporated herein by reference, except that in the event of any inconsistent disclosure or definition from the present specification, the disclosure or definition herein shall be deemed to prevail.

In some embodiments, at least some portion of the container comprises a flexible wall. In some embodiments, the choice of material for the container can be extended to non-polymer materials such as glass if sufficient room is left in the container during the filling process so as to accommodate the expansion of the beverage solution as it transitions from its liquid to solid state during the freezing process.

Another consideration in the choice of container material is the material's compatibility with microwave heating. In some embodiments, the material has a softening temperature greater than the temperature to which the beverage will be heated. One non-limiting example of such a representative material is polypropylene.

As shown in FIG. 1, a lid is applied to the disposable container filled with the degassed coffee-based beverage, as shown in step 104 of FIG. 1. In some embodiments, the headspace above the degassed coffee-based beverage is controlled so that an inert atmosphere is trapped above the beverage after the lid seals the container. The headspace pressure of inert atmosphere can be controlled so that it can compensate for the drop in pressure in the headspace caused by freezing the beverage, thus preventing the lid and disposable container from deforming inwardly due to a lower internal pressure. In some embodiments, the lidding material contains an aluminum film to help prevent oxygen penetration into the container after it is sealed. In some embodiments, the lids are applied to the disposable containers filled with coffee-based beverage using standard hot stamping techniques and equipment available in the packaging industry.

In some embodiments, as shown in step 105 of FIG. 1, the coffee-based beverage is frozen. The freezing process is accomplished by cooling the coffee-based beverage below the solution's freezing point. The freezing can be accomplished by a variety of methods and at a variety of different cooling rates. In some embodiments, the beverage can be dispensed into individual disposable containers that are ultimately purchased by the consumer. In some embodiments, the containers are then sent to a refrigeration system to cool the temperature of the beverage below its freezing point. The freezing process is performed as quickly as possible after the coffee-based beverage is dispensed into the disposable containers and sealed, preferably in less than 1 hour after the dispensing has occurred. In some embodiments, the freezing takes place in a large walk-in style freezer, such as that produced by manufacturers such as Elliot-Williams Co., Inc. In some embodiments, the refrigeration unit is an in-line unit such as the Cryoline® series sold by Linde, Inc. Other freezing techniques may also be employed including but not limited to the quick freezing techniques used for freezing shrimp, ice cream, and other foods, which employ cryogenic refrigerants. In such techniques, the food to be frozen is conveyed through a tunnel while being exposed to a cryogenic refrigerant. It is envisioned that the methods described herein can be performed in a modern food packaging facility in which the necessary equipment to brew a coffee-based beverage, degas the beverage, dispense the beverage into disposable containers, seal the containers under an inert atmosphere, and freeze the product are available such that the entire process can be performed rapidly and efficiently. In some embodiments, the completed coffee-based product is shipped frozen to retail stores, purchased by a consumer as a frozen beverage in a disposable cup, and stored at home or work in a freezer maintained at a temperature below the freezing point of the beverage.

Figure 2:
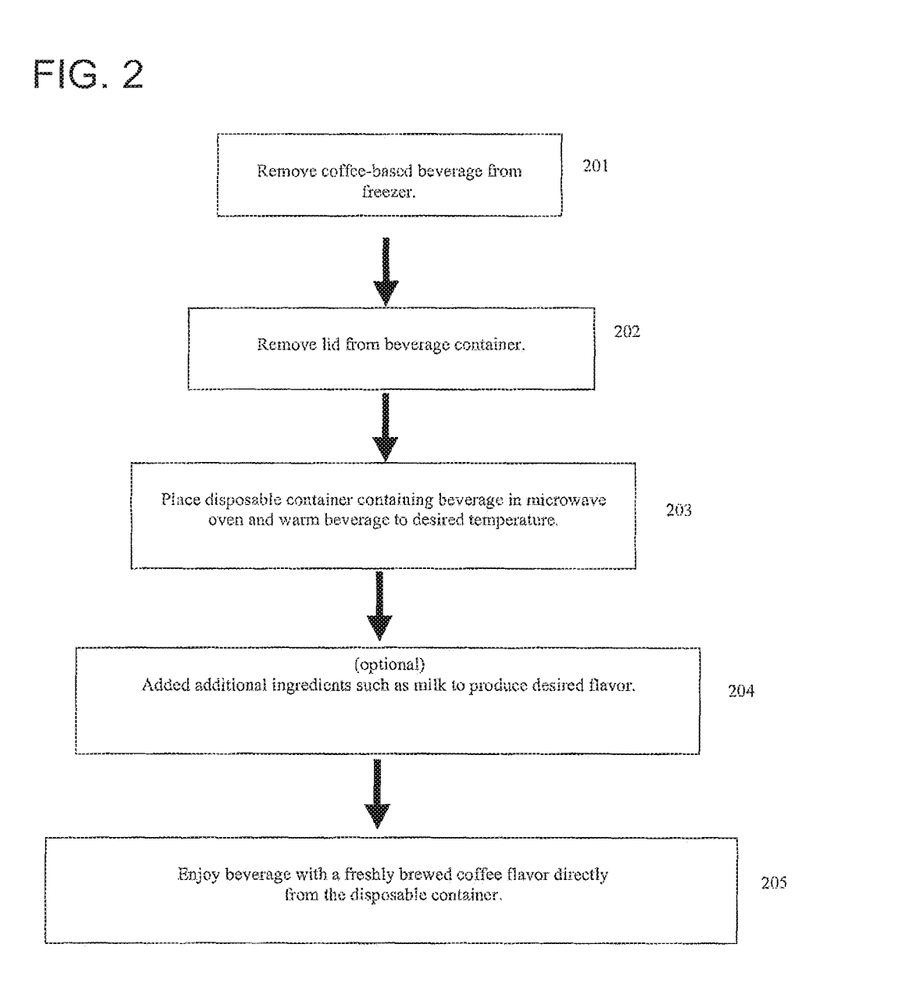
FIG. 2 shows a flowchart of a representative method for consuming a beverage produced in accordance with the present teachings.

FIG. 2 shows a flowchart outlining representative steps in the consumption of a coffee-based beverage prepared in accordance with the present teachings. When a coffee-based beverage is desired, the person retrieves a disposable container containing the beverage from the freezer as shown in step 201 of FIG. 2, removes the lidding material sealing the beverage as shown in 202, and places the beverage into a microwave oven for a period of time sufficient to heat the beverage to a temperature of a warm cup of coffee as shown in 203. Typically, the frozen beverage will need to be heated for a period of about 120 to about 180 seconds in order to reach the desired temperature, typically between about 60° C. (140° F.) and about 80° C. (176° F.). Of course, heating times will vary depending on the microwave's size, power settings, and desired beverage temperature. In some embodiments, the consumer wishes to consume black coffee and the beverage is ready to drink, as shown in 205. Alternatively, as shown in optional step 204, milk or other dairy products (e.g., cream) and a sweetener (e.g., sugar) can be added after heating to adjust the taste to the consumer's desire. It is to be noted that in contrast to conventional methods, no reconstituting of the beverage is required prior to consumption. In short, the present teachings provide a beverage in which the taste of freshly brewed coffee is combined with the convenience of a ready-to serve coffee beverage after a short reheating step.

The following example illustrates features in accordance with the present teachings, and is provided solely by way of illustration. It is not intended to limit the scope of the appended claims or their equivalents.

EXAMPLE

Blind taste test experiments were performed with two subjects. In both instances, the subject was asked to taste two cups of coffee. One cup of coffee was freshly prepared and the other cup of coffee had been prepared one month earlier by a method in accordance with the present teachings and then maintained in a freezer at −10° C. prior to being heated for the tasting. Both cups of coffee (i.e., freshly prepared and that obtained by heating frozen coffee in accordance with the present teachings) were prepared from the same type of coffee bean. In both instances, the subjects indicated the inability to distinguish any discernable taste difference between freshly brewed coffee and coffee prepared by heating frozen coffee in accordance with the present teachings. Moreover, the subjects indicated that both samples tasted like freshly brewed coffee.

The foregoing detailed description and accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding claim—whether independent or dependent—and that such new combinations are to be understood as forming a part of the present specification.

The invention claimed is:

1. A brewed beverage product comprising:
an oxygen permeable container containing a frozen deoxygenated brewed beverage, the frozen deoxygenated brewed beverage including a degassed coffee or tea based beverage or concentrate having dissolved oxygen physically removed from the degassed coffee or tea based beverage or concentrate to reduce its dissolved oxygen content to less than 2.0 parts per million (ppm) present in the degassed coffee or tea based beverage or concentrate;
wherein the frozen deoxygenated brewed beverage has an exterior surface formed from a frozen deoxygenated liquid so as to be substantially void-free in order to limit the ingress of oxygen into the frozen deoxygenated brewed beverage and to substantially restrict reactions involving oxygen to the exterior surface of the frozen deoxygenated brewed beverage while the frozen deoxygenated brewed beverage remains frozen.

2. The brewed beverage product of claim 1, wherein the substantially void-free exterior surface is maintained while the frozen deoxygenated brewed beverage remains frozen and stored in the oxygen permeable container.

3. The brewed beverage product of claim 1, wherein the frozen deoxygenated brewed beverage having the substantially void-free exterior surface in order to limit the ingress of oxygen into the frozen deoxygenated brewed beverage comprises a configuration that maintains the beverage or concentrate's dissolved oxygen content of less than 2.0 ppm for a period of up to one year while frozen and stored in the oxygen permeable container.

4. The brewed beverage product of claim 1, wherein coffee or tea-based flavor compounds in the degassed coffee or tea based beverage or concentrate remain substantially un-oxidized while the frozen ice remains frozen and stored in the oxygen permeable container.

5. The brewed beverage product of claim 1, wherein the oxygen permeable container containing the frozen deoxygenated brewed beverage is configured to be able to be reheated to create a ready-to-drink beverage in a liquid state.

6. The brewed beverage product of claim 5, wherein the ready-to-drink beverage in the liquid state has a reduced dissolved oxygen content of 2.0 ppm or less at the time of the transition from a frozen state to the liquid state.

7. The brewed beverage product of claim 1, further comprising a headspace of inert gas within the oxygen permeable container.

8. The brewed beverage product of claim 7, wherein the inert gas comprises nitrogen, argon, helium, neon, sulfur hexafluoride, or combinations thereof.

9. The brewed beverage product of claim 1, wherein the degassed coffee or tea based beverage or concentrate comprises a coffee-based beverage selected from the group consisting of affogato, caffé Americano, café au lait, café bombón, caffé latte, café mélange, coffee milk, cafe mocha, ca phe sua da, cappuccino, cortado, eiskaffee, espresso, flat white, frappuccino, gal o, Greek frappé coffee, iced coffee, Indian filter coffee, instant coffee, Irish coffee, kopi susu, liqueur coffee, macchiato, mochasippi, naked coffee, Turkish coffee, Vienna coffee, yuanyang, and combinations thereof.

10. The brewed beverage product of claim 1, wherein the degassed coffee or tea based beverage or concentrate comprises a tea-based beverage selected from the group consisting of white tea, yellow tea, green tea, oolong, tea, black tea, post-fermented tea, herbal tea, or combinations thereof.

11. The brewed beverage product of claim 1, wherein the frozen deoxygenated liquid forming the exterior surface comprises a water interface that is configured to mix with the coffee or tea based beverage or concentrate upon thawing.

12. A brewed beverage product comprising:
a microwaveable container made of an oxygen-permeable material;
wherein the microwaveable container contains a degassed frozen solution having dissolved oxygen physically removed from the degassed frozen solution to reduce its dissolved oxygen content to less than 2.0 parts per million (ppm) present in the degassed frozen solution;
wherein the degassed frozen solution has an exterior surface that is substantially free of voids, the substantially void-free exterior surface being formed so as to limit oxygen from diffusing into the degassed frozen solution while it remains frozen.

13. The brewed beverage product of claim 12, wherein the substantially void-free exterior surface is maintained while the frozen degassed brewed beverage remains frozen and stored in the microwaveable container.

14. The brewed beverage product of claim 12, wherein the substantially void-free exterior surface being formed so as to limit oxygen from diffusing into the degassed frozen solution while it remains frozen comprises a configuration that maintains degassed frozen solution's dissolved oxygen content of less than 2.0 ppm for a period of up to one year while frozen and stored in the microwaveable container.

15. The brewed beverage product of claim 12, wherein the microwaveable container containing the degassed frozen solution is configured to be able to be reheated to create a ready-to-drink beverage in a liquid state.

16. The brewed beverage product of claim 15, wherein the ready-to-drink beverage in the liquid state has a reduced dissolved oxygen content of 2.0 ppm or less at the time of the transition from a frozen state to the liquid state.

17. The brewed beverage product of claim 12, wherein the degassed frozen solution comprises a degassed coffee or tea based solution, degassed water, or both separated by a frozen interface.

18. The brewed beverage product of claim 12, wherein the oxygen-permeable container or packaging comprises an oxygen-permeable wall, wherein the frozen brewed beverage is contained within the oxygen-permeable wall.

19. A brewed beverage product comprising:
   a) a degassed frozen brewed beverage that has a dissolved oxygen content of 2 ppm or less; and
   b) an oxygen permeable container or packaging containing the degassed frozen brewed beverage.

20. The brewed beverage product of claim 19, wherein the degassed frozen brewed beverage has a substantially void-free exterior surface that limits the ingress of oxygen into the degassed frozen degassed brewed beverage and maintains the degassed frozen brewed beverage's dissolved oxygen content of 2 ppm or less for a period of up to one year while frozen and stored in the oxygen permeable container.

\* \* \* \* \*